United States Patent [19]

Vorbach et al.

[11] 4,405,957
[45] Sep. 20, 1983

[54] PLUG-IN DEVICE FOR DISC-SHAPED RECORDING MEDIA IN A DRIVE

[75] Inventors: Guenther Vorbach, Schwindegg; Georg Böehmer, Munich, both of Fed. Rep. of Germany

[73] Assignee: Siemens Aktiengesellschaft, Berlin & Munich, Fed. Rep. of Germany

[21] Appl. No.: 265,622

[22] Filed: May 20, 1981

[30] Foreign Application Priority Data

Jun. 9, 1980 [DE] Fed. Rep. of Germany ....... 3021604

[51] Int. Cl.³ ...................... G11B 5/016; G11B 17/02
[52] U.S. Cl. ......................................... 360/99; 360/97
[58] Field of Search ..................... 360/99, 97, 133, 86; 206/444, 309, 312

[56] References Cited

U.S. PATENT DOCUMENTS

| | | | |
|---|---|---|---|
| 3,890,643 | 6/1975 | Dalziel | 360/99 |
| 3,940,793 | 2/1976 | Bleiman | 360/99 |
| 4,139,876 | 2/1979 | Owens | 360/97 |
| 4,179,718 | 12/1979 | Rolph | 360/99 |
| 4,205,355 | 5/1980 | Hamanaka et al. | 360/99 |

Primary Examiner—Alfred H. Eddleman
Attorney, Agent, or Firm—Hill, Van Santen, Steadman & Simpson

[57] ABSTRACT

Apparatus for loading and precisely positioning a magnetic disc in a drive housing is provided including a spring biased stop member for receiving the interior edge of the magnetic disc and a pivotal cover flap for directing insertion of the disc interiorly of the drive housing. The cover flap is provided with a lock spring element which presses against the outer edge of the magnetic disc and pushes it against the biased stop. The stop member is formed with a locating projection and the cover flap is formed with beveled guide surfaces to precisely orient the disc within the drive housing. Displacement of the stop member is limited by cooperating abutment means, so that precise operating position of the disc in the drive housing is afforded. As the cover flap is closed, a cam member formed on the cover flap activates a clamping member simultaneous with the final positioning of the disc in the drive housing to effect a frictional connection between the magnetic disc and a rotatable drive device.

13 Claims, 3 Drawing Figures

PLUG-IN DEVICE FOR DISC-SHAPED RECORDING MEDIA IN A DRIVE

BACKGROUND OF THE INVENTION

1. Field of the Invention

The invention relates to an apparatus for loading and positioning a magnetic disc in a disc cartridge drive housing.

2. The Prior Art

Drives for disc-shaped recording media, particularly flexible magnetic discs in envelopes, are generally known. These so-called floppy disc drives are being employed to an ever-increasing degree of memory storage units for printing devices. These drives conventionally have an insertion guide slot into which the magnetic disc is loaded. After introduction of the disc, the disc is clamped into a frictional connection with a rotatable drive device for rotation of the disc in the drive housing.

It is necessary to precisely align the disc within the drive housing in order to enable accurate reading of the high density information bits stored on the disc. Alignment of the disc is conventionally afforded by means of guide stop members located in the drive housing. The magnetic disc is formed with a central hole at which the disc is clamped to the rotatable drive. The drive must not engage with the disc central opening until the disc itself is properly situated in an operating position.

The present invention is directed to loading apparatus for a magnetic disc drive housing which makes possible precise alignment of the magnetic disc in a simplified manner and simultaneously effects the frictional clamping connection between the rotatable drive device and the disc. The inventive loading apparatus simplifies the manner by which magnetic discs are inserted into drive housings and makes possible easy servicing.

SUMMARY OF THE INVENTION

Apparatus is provided for loading disc-shaped recording media into a drive housing through an introduction guide slot formed in the housing including a cover flap member which serves to aid in alignment of the disc and simultaneously effect connection of the disc with a rotatable drive device. The cover flap contains a lock spring element which, when the flap is closed, engages the disc and presses it against a spring-biased catch stop. As the disc is engaged by the cover flap, guide surfaces serve to align the disc and a cam member formed on the flap activates a clamping member for bringing the disc into frictional connection with the rotatable drive device. The loading apparatus enables positioning of the disc-shaped recording medium precisely within the drive housing and free of buckling.

The catch stop is positioned on a guide strip carrying a spring biasing the catch stop member against the magnetic disc. Displacement of the magnetic disc is limited by abutment means formed on the catch stop and guide strip. The guide strip is connected to an adjustable bracket secured on the drive housing, so that the positioning action of the loading apparatus can be adjusted in a simple manner. Preferably, the displacement range of the catch stop is set in such a manner that the magnetic disc projects from the introduction guide sufficiently to enable the operator to grasp the disc when the cover flap is opened. Thus, it is possible to interchange magnetic discs in relatively easy fashion, even when the disc drive is built into the closed housing of a text printer.

DESCRIPTION OF THE PREFERRED EMBODIMENT

Figure 1:
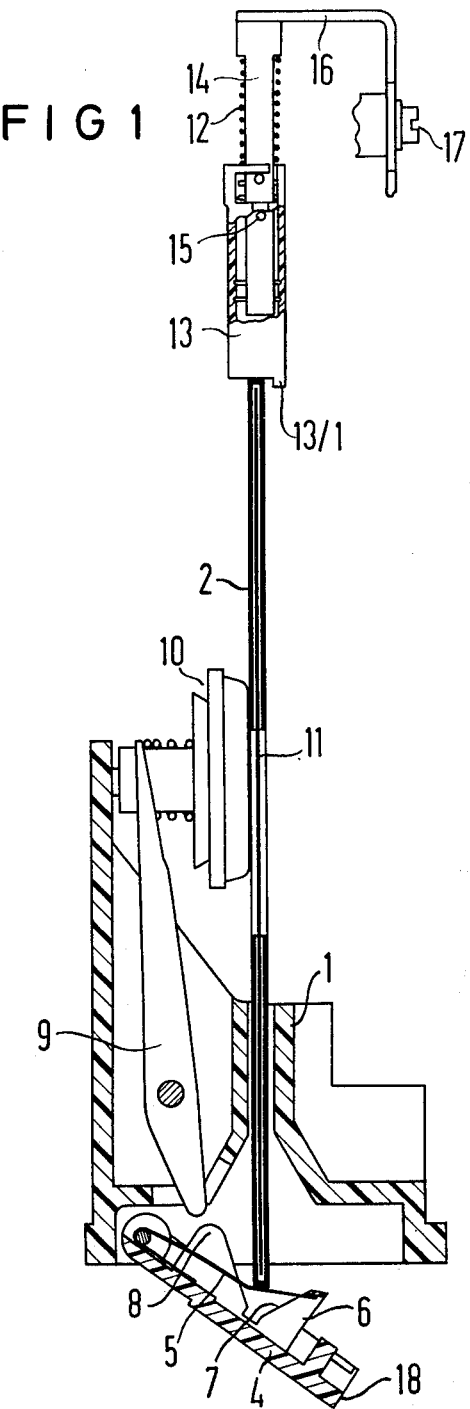
FIG. 1 is a schematic, cross-sectional side elevational view illustrating the loading apparatus of the present invention with the cover flap open.
Figure 2:
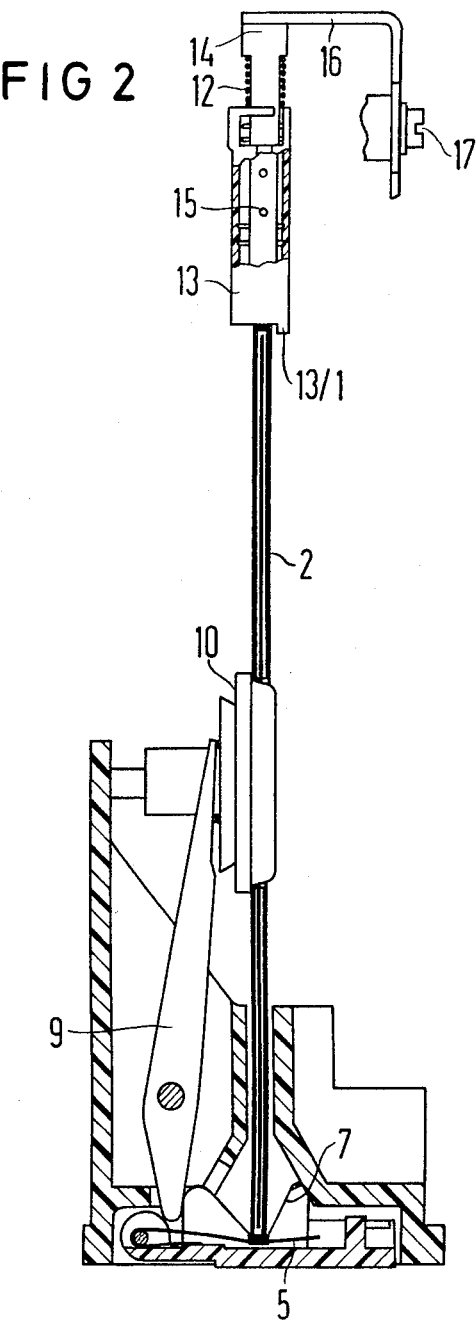
FIG. 2 is a schematic, cross-sectional side elevational view illustrating the loading apparatus of the present invention with the cover flap closed.
Figure 3:
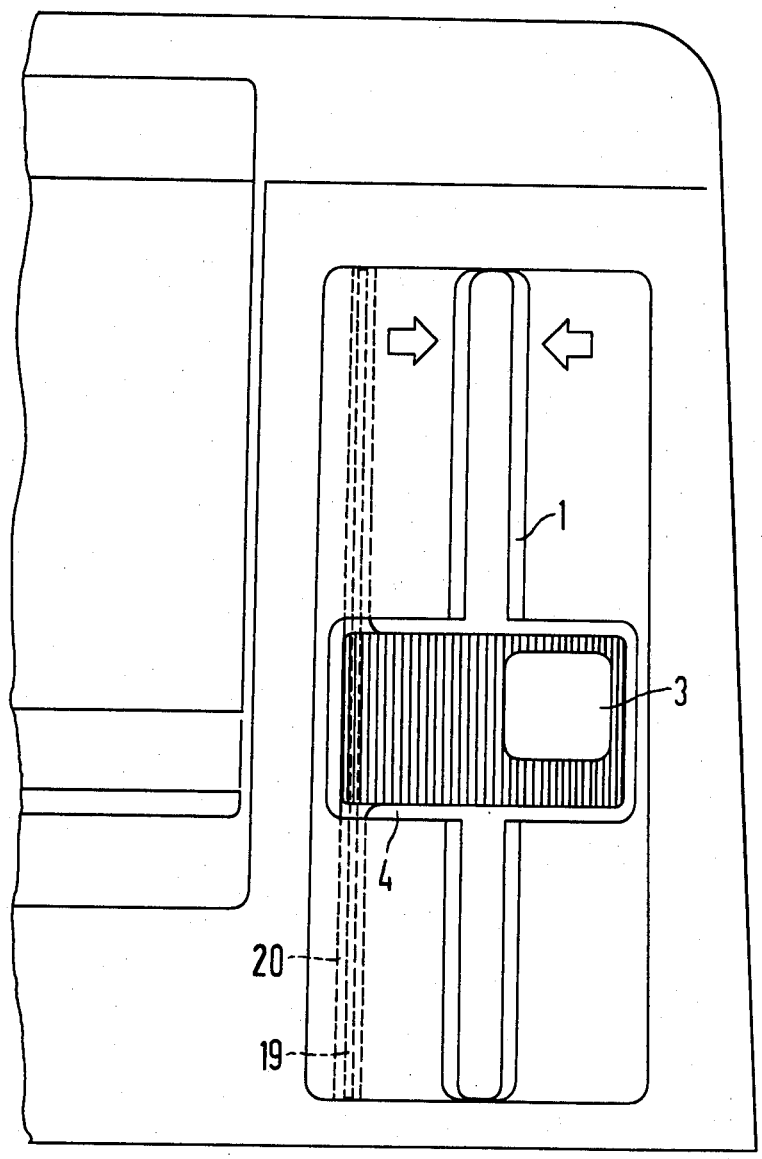
FIG. 3 is a fragmentary schematic front elevational view illustrating the cover flap and introduction slot for the loading apparatus of the present invention.

With references to FIGS. 1–3, a drive housing for receiving a disc-shaped recording medium contained in an envelope or a floppy disc, is provided with an introduction guide slot 1 for the insertion of a magnetic disc 2. In accordance with the present invention, a loading apparatus is provided which enables precise positioning of the magnetic disc 2 in the drive housing while simultaneously engaging the frictional connection between the disc and a rotatable drive device (not shown).

The loading apparatus comprises a pivotable cover flap 4, which extends transversely across a portion of the introduction slot 1 and defines therebetween a recess area 3 whereby an operator can grasp the magnetic disc 2 along its outer edge during insertion or removal relative to the drive housing. A lock spring element 5 extends along the interior-facing surface of the cover flap 4. The lock spring 5 has an outer free tip which is movable within a lateral spaced defined by a guide block 6.

The guide block 6 is formed with interior-facing beveled guide surfaces 7 for engaging and aligning the magnetic disc 2 as described below. An outer end of the guide block 6 is formed with a cam member 8 for engaging with a corresponding end of a lever 9 when the cover flap is closed along the drive housing. The opposed end of the lever 9 operatively engages with a slidable clamping member 10 which serves to center and clamp the magnetic disc 2 into frictional connection with the rotatable drive (not shown). The clamping member 10 is introduced into a central opening 11 disposed on the magnetic disc 2 for fixing the magnetic disc in frictional connection with the drive device.

Positioned within the drive housing across from the introduction slot 1 is a catch stop means 13 having a leading face formed with a locating projection 13/1 for receiving the interior edge of the magnetic disc 2 as it is positioned within the drive housing. The catch stop means 13 is formed as a cylindrical body which is slidably disposed over a guide bar or strip 14. A spring 12 serves to bias the stop 13 inwardly against the magnetic disc 2. The guide bar 14 is formed with outwardly protruding abutments 15 which coact with corresponding ridges formed on the stop member 13 to limit outward and inward displacement of the stop. The guide bar 14 is secured to a plate member 16 mounted on the drive housing and which is adjustable by means of oversized openings secured by screws 17. This simplified adjustability of the plate 16 affords simple adjustment of the relative positioning of the stop member 13 for accurate positioning of the magnetic disc in the drive housing.

Operation of the loading and positioning apparatus of the present invention is as follows. The cover flap 4 is initially opened, enabling the insertion of the magnetic disc 2 through the introduction slot 1 until it strikes the stop 13 and rests against the locating projection 13/1 of the stop. The length of the stop member 13 is such that an outer edge of the magnetic disc continues to project far enough into the recess 3 that it can easily be grasped by the operator. As the cover flap 4 is closed, as shown in FIG. 1, the lock spring element 5 comes to bear against the outer edge of the magnetic disc and the disc edge slides along the beveled guide surfaces 7 of the guide block 6. The biasing force of the spring element 5 is greater than that of the spring 12, preferably by the ratio of approximately 3:1. Accordingly, as the flap 4 is closed, the spring element 5 pushes the magnetic disc 2 against the force of the spring 12 until the disc is properly positioned within the drive housing as defined by engagement of the stop abutments 15 with the stop member corresponding ridges. Just as the magnetic disc 2 is set in the drive housing, a cam 8 causes the lever 9 to pass the clamping member 10 into the disc opening 11 so that a frictional connection between the rotatable drive device and the disc, as shown in FIG. 2.

To remove the magnetic disc 2, the cover flap 4 is opened, whereby the clamping member 10 pulls away from the magnetic disc. The disc is then pushed by the stop member 13 through the force of the spring 12 out through the guide slot 1 such that it can be grasped by the operator.

The cover flap 4 may be pivotally biased by a spring means (not shown) and locked into its closed position by a locking stop means coacting with a flap edge 18. As illustrated in FIG. 3, the cover flap 4 extends across only a central portion of the guide slot 1. The cavity 3 is preferably ergonomically dimensioned so as to afford sufficient width, approximately over the width of a thumb, for the operator to grasp the protruding edge of the magnetic disc 2 when the cover flap is opened.

Buckling of the magnetic disc is avoided during closing of the cover flap 4, since the flap 4 is pivotally closed over an axle 19 disposed along the introduction slot 1 and locked into the drive housing. The cover flap 4 is formed with a foot portion 20 which semicircularly surrounds the axle 19 along the entire length of the axle.

Although various minor modifications may be suggested by those versed in the art, it should be understood that we wish to embody within the scope of the patent warranted hereon all such modifications as reasonably and properly come within the scope of our contribution to the art.

We claim as our invention:

1. A drive apparatus for a flexible disc-shaped recording medium having a central opening through which said recording medium is driven, comprising rotatable drive means and means for loading and positioning said recording medium, including an introductin slot means, a resiliently mounted stop member positioned across from said slot means, a pivotally mounted flap member for opening and closing said slot means, a spring element mounted on said flap member for pressing said recording medium against said stop member during closing of said flap member over said slot means for resilient loading and positioning of said recording medium for operation in said drive apparatus, and engagement means associated with said flap member for frictionally connecting said recording medium adjacent said central opening with said drive means as said flap member is closed.

2. The drive apparatus of claim 1, wherein said recording medium is a flexible magnetic disc.

3. The drive apparatus of claim 1, wherein said stop member is reciprocable along a guide means, said stop member and guide means having cooperating abutment stops for defining a displacement range for travel of said stop member on said guide means.

4. The drive apparatus of claim 3, wherein said displacement range permits said stop member to push said recording medium sufficiently outward from slot means upon opening of said flap member to enable grasping of an outer edge area of said recording medium.

5. The drive apparatus of claim 3, wherein said guide means is connected to an adjustable positionable bracket means.

6. The drive apparatus of claim 1, wherein said flap member is formed with a guide block portion having guide surfaces for aligning an edge of said recording medium against said spring element.

7. The drive apparatus of claim 1, wherein said stop member is formed with a locating projection means for aligning an edge of said recording medium.

8. The drive apparatus of claim 1, wherein said slot means is recessed beneath said flap member to define a grasping cavity.

9. The drive apparatus of claim 1, wherein said flap member covers only a portion of said slot means when closed.

10. The drive apparatus of claim 1, wherein said flap member is pivotable about an elongated axle means secured in said drive apparatus, said flap member having a foot portion semicircularly surrounding said axle means over the entire length of said axle means.

11. The drive apparatus of claim 10, wherein said axle means extends beyond side edges of said flap member.

12. The drive apparatus of claim 1, wherein said engagement means comprises a cam surface formed on said flap member, a reciprocable clamping member movable between first and second positions respectively releasing and frictionally engaging said recording medium with said drive means, and a lever means mounted between said flap member and said clamping member for engagement by said cam surface to control movement of said clamping member between its first and second positions.

13. The drive apparatus of claim 1, wherein said stop member is spring-biased toward said slot means, the biasing force of said spring element is approximately three times greater than the spring force biasing said stop member.

* * * * *